(12) United States Patent
Wu et al.

(10) Patent No.: US 10,132,345 B2
(45) Date of Patent: Nov. 20, 2018

(54) FASTENING DEVICE

(71) Applicant: HANWIT PRECISION INDUSTRIES LTD., New Taipei (TW)

(72) Inventors: Ming-De Wu, New Taipei (TW); Ming-Chung Chiu, New Taipei (TW)

(73) Assignee: HANWIT PRECISION INDUSTRIES LTD., New Taipei (TW)

( * ) Notice: Subject to any disclaimer, the term of this patent is extended or adjusted under 35 U.S.C. 154(b) by 137 days.

(21) Appl. No.: 15/409,376

(22) Filed: Jan. 18, 2017

(65) Prior Publication Data

US 2018/0202481 A1 Jul. 19, 2018

(51) Int. Cl.
  *F16B 21/00* (2006.01)
  *F16B 39/24* (2006.01)
  *F16B 5/02* (2006.01)

(52) U.S. Cl.
  CPC ............ *F16B 39/24* (2013.01); *F16B 5/0208* (2013.01); *F16B 5/0266* (2013.01)

(58) Field of Classification Search
  CPC combination set(s) only.
  See application file for complete search history.

(56) References Cited

U.S. PATENT DOCUMENTS

| | | | | |
|---|---|---|---|---|
| 2,907,418 | A * | 10/1959 | Hudson | F16B 5/0208 403/21 |
| 4,616,967 | A * | 10/1986 | Molina | F16B 41/002 411/105 |
| 5,769,118 | A * | 6/1998 | Lenberg | F16K 31/60 116/277 |
| 8,657,545 | B2 * | 2/2014 | Magno, Jr. | F16B 7/187 248/214 |
| 2011/0070049 | A1 * | 3/2011 | Wang | F16B 5/0208 411/372.6 |

* cited by examiner

*Primary Examiner* — Gary W Estremsky
(74) *Attorney, Agent, or Firm* — Muncy, Geissler, Olds & Lowe, P.C.

(57) ABSTRACT

The present disclosure illustrates a fastening device including a sleeve, a rotary knob device and a drive cap. The sleeve is formed with a through-hole which defines a rotation space at a side thereof. A fastening part and a position-limiting ring are formed on an outer side of the sleeve, and the position-limiting ring includes multiple position-limiting fastening grooves on a periphery thereof. The rotary knob device includes a rotary rod movably inserted through the through-hole. The assembly space of the sleeve is formed with a sliding inner hole for covering the position-limiting ring of the sleeve, and the position-limiting ring is longitudinally movable in the sliding inner hole, and the sliding inner hole includes two long protrusion rods and two short protrusion rods formed on the sidewall thereof and separately fastened in the position-limiting fastening grooves. Therefore, the fastening device can be operated for locking or unlocking easily.

7 Claims, 10 Drawing Sheets

FASTENING DEVICE

BACKGROUND OF THE INVENTION

1. Field of the Invention

The present disclosure relates to a fastening device, more particularly to a fastening device which can be operated between a locked or unlocked state conveniently. A drive cap of the fastening device includes two long protrusion rods and two short protrusion rods which are separately aligned with position-limiting fastening grooves on a periphery of a position-limiting ring of a sleeve of the fastening device, and the drive cap can be used to drive a rotary knob device of the fastening device to move along a through-hole of the sleeve, and a rotation pin at an end of a rotary rod of the rotary knob device is moved into or out of rotation space of the sleeve, thereby facilitating to operate the fastening device.

2. Description of the Related Art

Conventionally, in order to assemble or combine two plates (that is, plate-to-plate application), a fastening screw having a knob, a collar and a screw is usually used to lock the two plates. The screw and the collar are fastened on the outer plate, and the knob is then rotated to insert the screw into the inner plate for pre-positioning, and the user can lock the screw tightly by using hand tools, thereby locking the outer and inner plates integrally. Aforesaid way of locking the multiple-layered plates can be used for machine tool or other plate-to-plate application field. In the machine tool, a driving device or a speed adjusting device usually requires the operation of locking the plates. The driving device or the speed adjusting device is located inside the machine housing, and when the driving device crashes or malfunctions, or the speed adjusting device performs speed changing or adjusting operation, the plates can be detached for maintenance or adjusting operation. The plate is locked by a plurality of fastening screws, so the user may lose the fastening screw easily during the detaching process and be unable to relock the plate in its original position, which results in inconvenience and problem in assembly and detachment of the plates. Therefore, there is a manufacturer developing a fixing device which includes a cap part, a screw part and a fastening part, to solve the shortcoming that the locking screw may be lost easily. The fastening part of the fixing device is mounted into a hole of a plate, and the screw part is locked and fastened on other plate. After the user separates the plates from each other, the fixing device is still fastened in the hole of the plate by the fastening part, thereby preventing the fixing device from being lost. However, in order to assemble the plates, the user must apply force or using hand tools (such as screwdriver or wrench) to perform the locking or detaching operation of the fixing device. As a result, the fixing device has some drawbacks in actual application.

In recent years, under requirement for mass production and process efficiency based on modularization, the manual assembly process of combining the two plates by using screws may greatly affect delivery progress of the manufacturer. Furthermore, the small-sized screw may be lost during process of locking the two plates, and it may be difficult to assemble, align or lock the two plates because of different thread hole size, mismatch between thread number or thread distance of thread holes on the two plates. Furthermore, the space between the two plates for operating the screws is very narrow, so the operation of locking or unlocking the screws may be obstructed by peripheral objects, and it causes inconvenience, waste of working hour, more production cost and overhead for manufacturer.

Therefore, what is need is to develop a fastening device to solve the problem that the conventional fixing device for locking the plates may be loosened because of being rotated accidentally, and the user must apply force or use hand tools to operate the conventional fixing device for assembly.

SUMMARY OF THE INVENTION

In order to solve the conventional problem, inventor develops a fastening device according to multiple tests and modifications, and years of experience. The fastening device includes a sleeve which includes a position-limiting ring at a periphery thereof, and the position-limiting ring includes two sets of position-limiting fastening grooves opposite to each other. A rotary knob device is inserted through the sleeve and includes a rod head which is assembled with a drive cap. The drive cap includes an assembly space, and two long protrusion rods and two short protrusion rods are formed in a sliding inner hole at a side of the assembly space, and aligned with the position-limiting fastening grooves separately. The drive cap is longitudinally movable along the position-limiting ring of the sleeve to drive the rotary knob device to longitudinally move along the through-hole of the sleeve, thereby achieving simple operation for locking or unlocking.

An objective of the present disclosure is to provide a fastening device including a sleeve, a rotary knob device and a drive cap. The sleeve is in a hollow shape and formed with a through-hole inside, and the through-hole defines a rotation space at a side thereof. A fastening part and a position-limiting ring are formed on an outer side of the sleeve, and the position-limiting ring includes at least two sets of position-limiting fastening grooves disposed on a periphery thereof and opposite to each other. The rotary knob device includes a rotary rod movably inserted through the through-hole, and an elastic member is mounted on the rotary rod and abutted with an inner wall of the through-hole by an end thereof. The rotary rod includes a rotation pin disposed at an end thereof and movably located in the rotation space of the through-hole, and a rod head disposed at other end thereof opposite to the rotation pin and exposed out of the sleeve. The assembly space of the sleeve is formed with a sliding inner hole for covering the position-limiting ring of the sleeve, and the position-limiting ring is longitudinally movable in the sliding inner hole, and the sliding inner hole includes two long protrusion rods formed on a sidewall thereof and opposite to each other, and two short protrusion rods formed on the sidewall thereof and opposite to each other. The two long protrusion rods and the two short protrusion rods are separately fastened in the position-limiting fastening grooves formed on a periphery of the position-limiting ring of the sleeve. As a result, the long protrusion rods and the short protrusion rods can be driven to separately move along the position-limiting fastening grooves longitudinally and, at the same time, the drive cap drives the rotation pin at the end of the rotary rod of the rotary knob device to longitudinally move into or out of the rotation space at the side of the sleeve, thereby achieving the purpose of easily operating the fastening device for locking or unlocking.

Other objective of the present disclosure is that an axle hole is formed between the through-hole of the sleeve and the rotation space on a side of the sleeve, and the axle hole has a reduced diameter and the rotary rod is inserted through the axle hole, and an abutting shoulder part is formed in the through-hole adjacent to the axle hole and configured to abut with an end of the elastic member; the at least two sets of the position-limiting fastening grooves are separately arranged with equal angles of 90 degrees on the periphery of the position-limiting ring, and two first ring edges having relatively larger outer diameters and two second ring edges having relatively smaller outer diameters are formed on the periphery of the position-limiting ring. The two first ring edges are disposed opposite to each other, the two second ring edges are disposed opposite to each other, and each of the two first ring edges and the two second ring edges are formed between the two adjacent position-limiting fastening grooves.

Other objective of the present disclosure is that the rotary rod of the rotary knob device is formed with a hole laterally penetrating through the rotary rod, and the rotation pin is inserted through and positioned in the hole, and the rotation pin includes ring protrusions disposed at two ends thereof and exposed out of the hole; the drive cap includes two long protrusion rods opposite to each other and two short protrusion rods opposite to each other formed on the inside wall of the sliding inner hole at the side of the assembly space, the two long protrusion rods and the two short protrusion rods are arranged in equal angles of 90 degrees and staggered with each other, and rotation sections are separately formed adjacent to a fastening recess, between two long protrusion rods and above the two short protrusion rods, so that the position-limiting ring at the side of the sleeve are axially rotatable in the rotation sections.

BRIEF DESCRIPTION OF THE DRAWINGS

The structure, operating principle and effects of the present disclosure will be described in detail by way of various embodiments which are illustrated in the accompanying drawings.

DETAILED DESCRIPTION OF THE PREFERRED EMBODIMENTS

Figure 1:
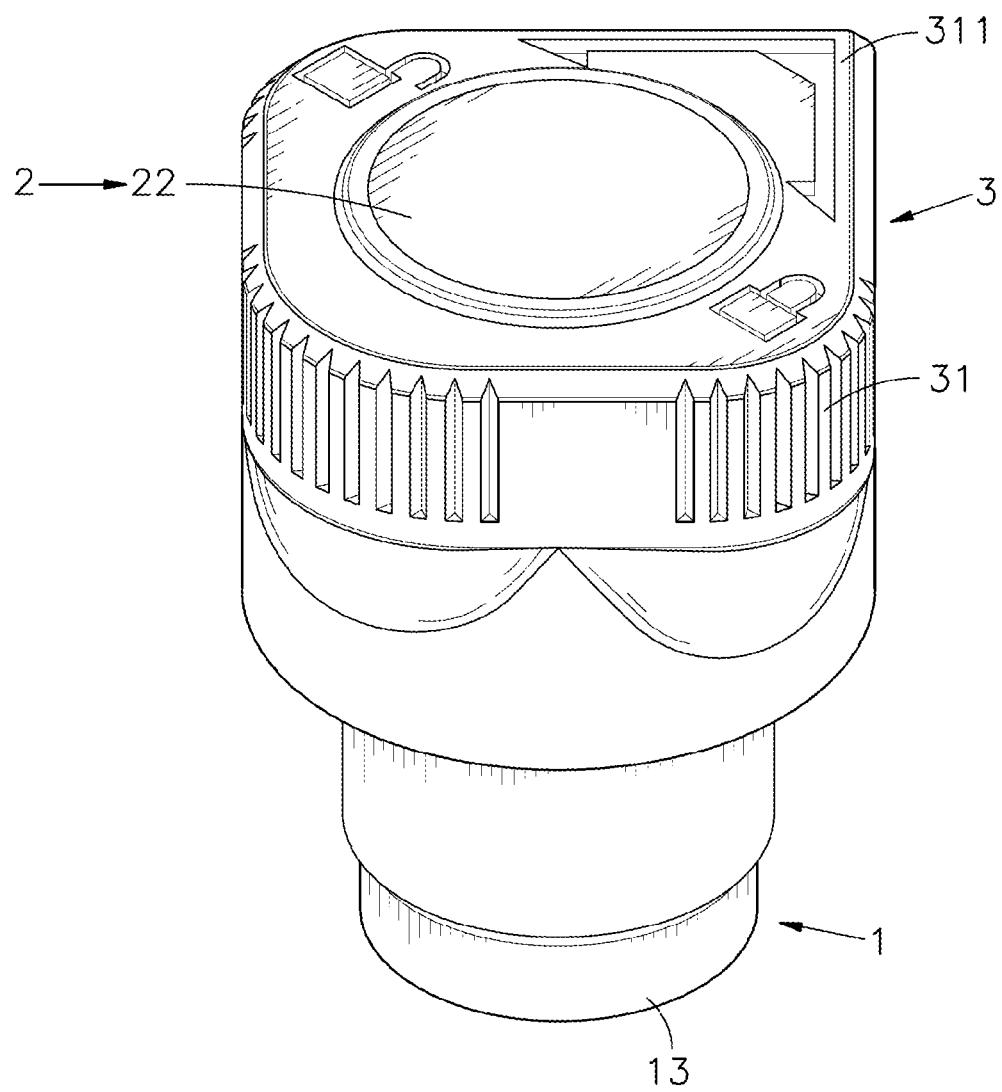
FIG. 1 is an elevational view of a fastening device of the present disclosure.

The following embodiments of the present invention are herein described in detail with reference to the accompanying drawings. These drawings show specific examples of the embodiments of the present invention. It is to be understood that these embodiments are exemplary implementations and are not to be construed as limiting the scope of the present invention in any way. Further modifications to the disclosed embodiments, as well as other embodiments, are also included within the scope of the appended claims. These embodiments are provided so that this disclosure is thorough and complete, and fully conveys the inventive concept to those skilled in the art. Regarding the drawings, the relative proportions and ratios of elements in the drawings may be exaggerated or diminished in size for the sake of clarity and convenience. Such arbitrary proportions are only illustrative and not limiting in any way. The same reference numbers are used in the drawings and description to refer to the same or like parts.

It is to be understood that, although the terms 'first', 'second', 'third', and so on, may be used herein to describe various elements, these elements should not be limited by these terms. These terms are used only for the purpose of distinguishing one component from another component. Thus, a first element discussed herein could be termed a second element without altering the description of the present invention. As used herein, the term "or" includes any and all combinations of one or more of the associated listed items.

Figure 2:
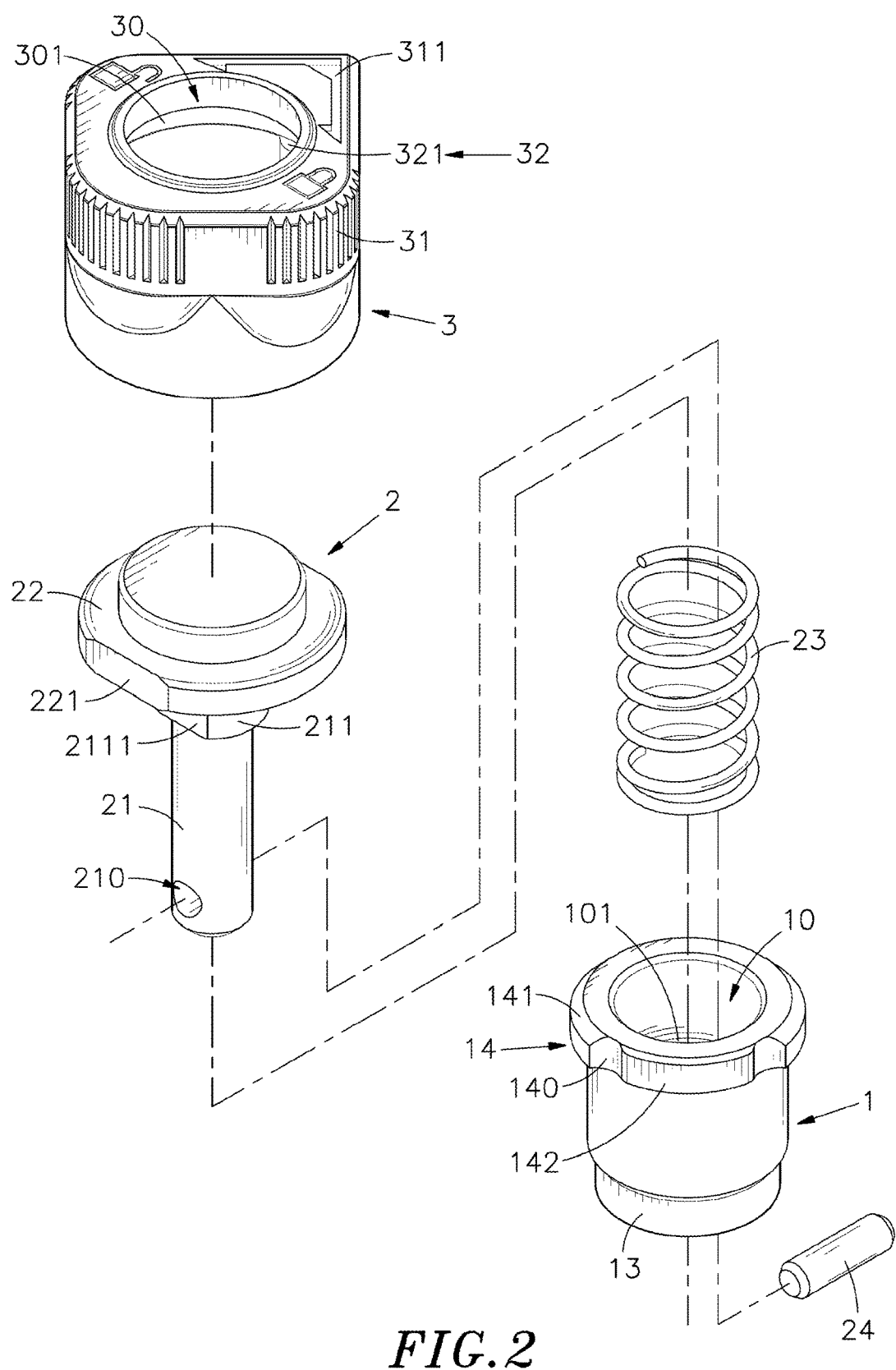
FIG. 2 is an exploded view of the fastening device of the present disclosure.
Figure 3:
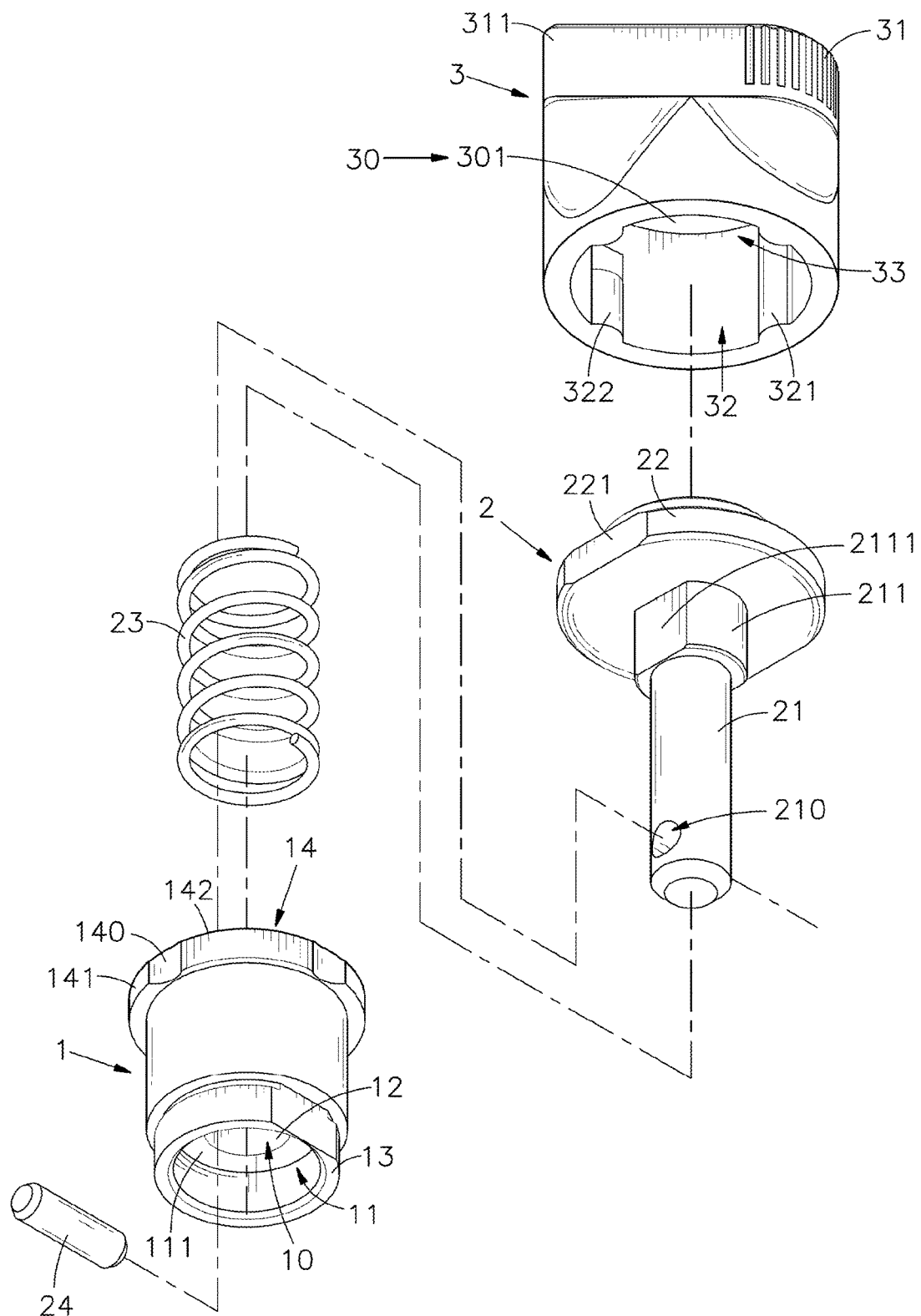
FIG. 3 is an exploded view of the fastening device of the present disclosure, when viewed from another direction.
Figure 4:
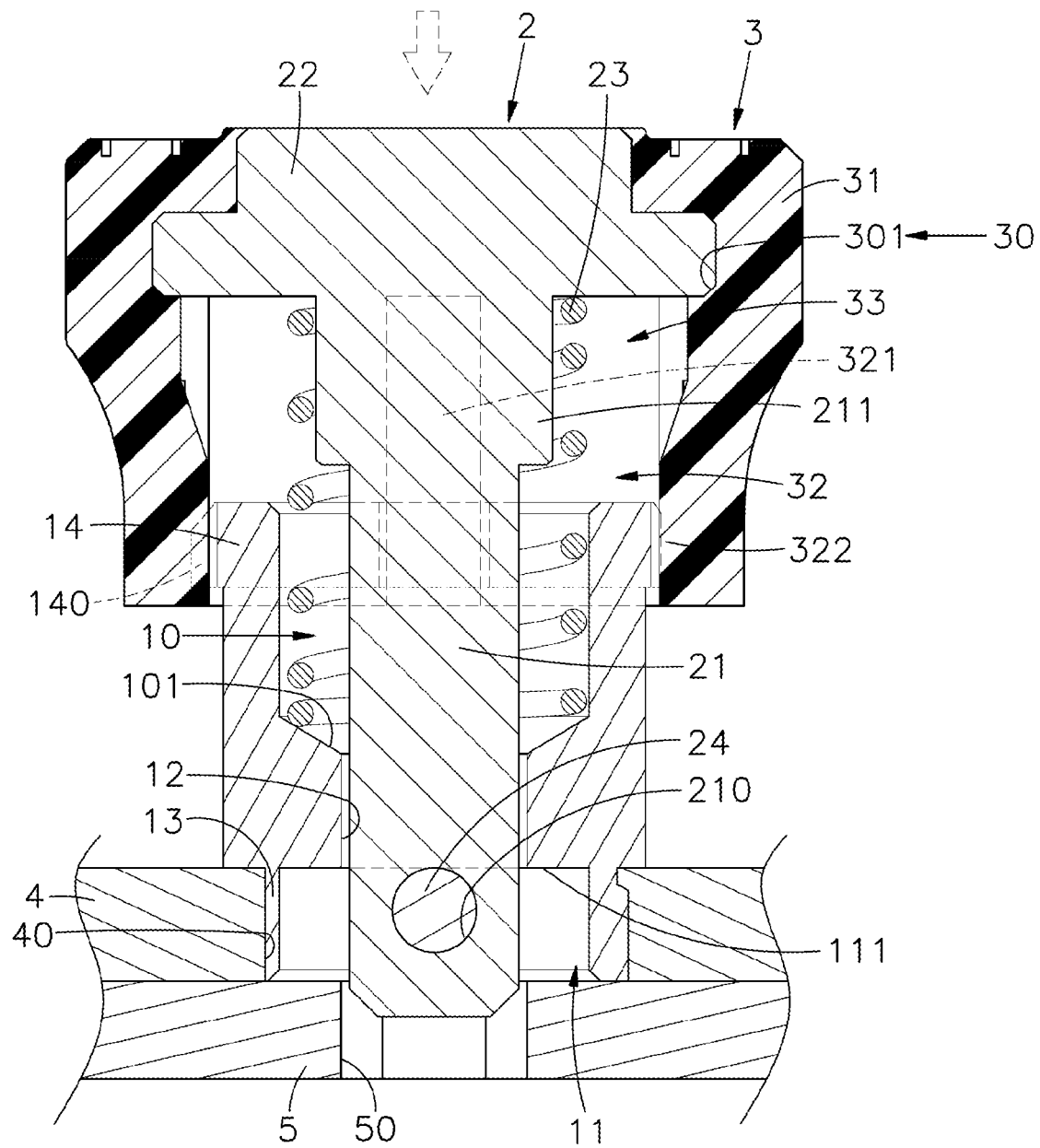
FIG. 4 is a sectional side view of a preferred embodiment of the fastening device of the present disclosure.
Figure 5:
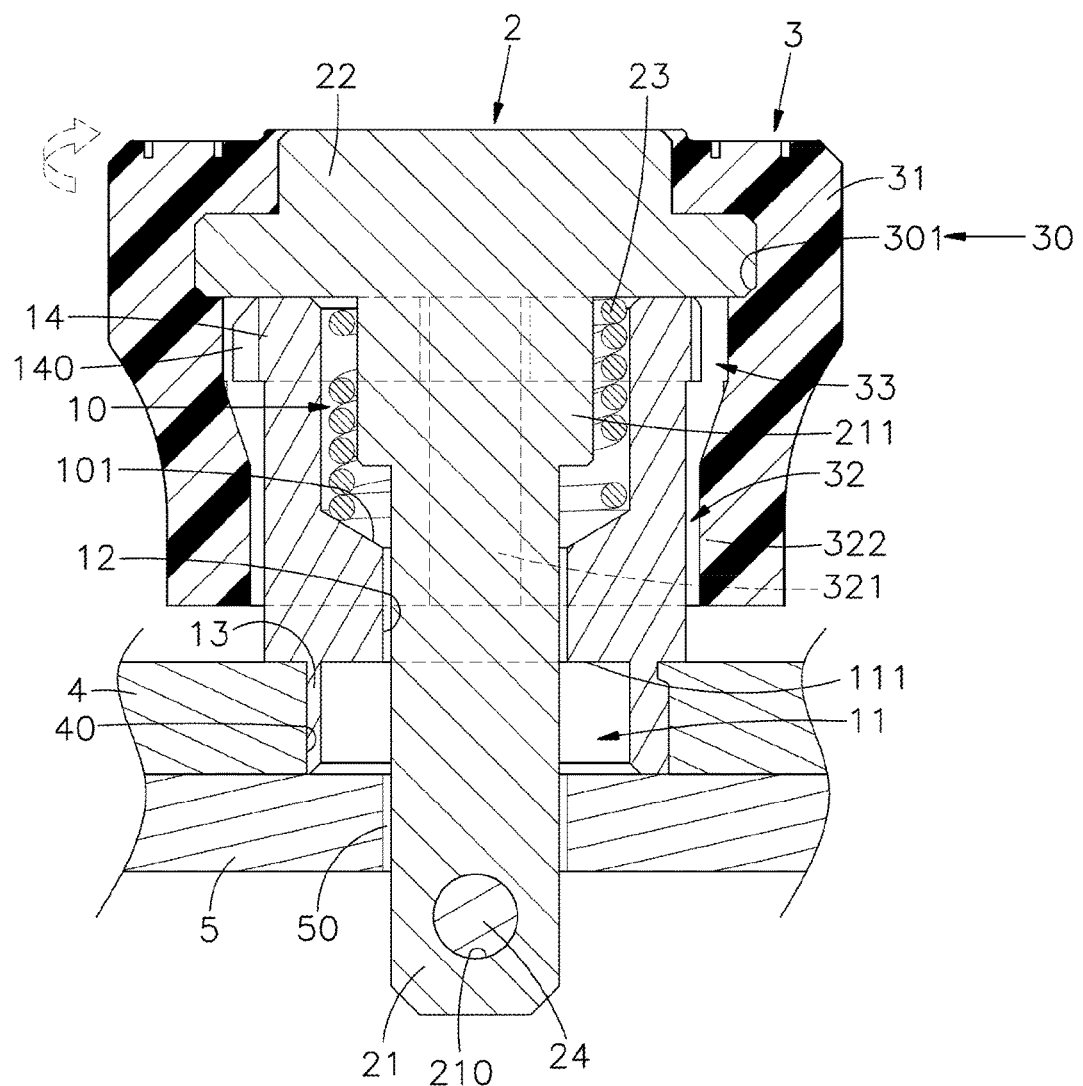
FIG. 5 is a sectional side view of operation of the preferred embodiment of the fastening device of the present disclosure.
Figure 6:
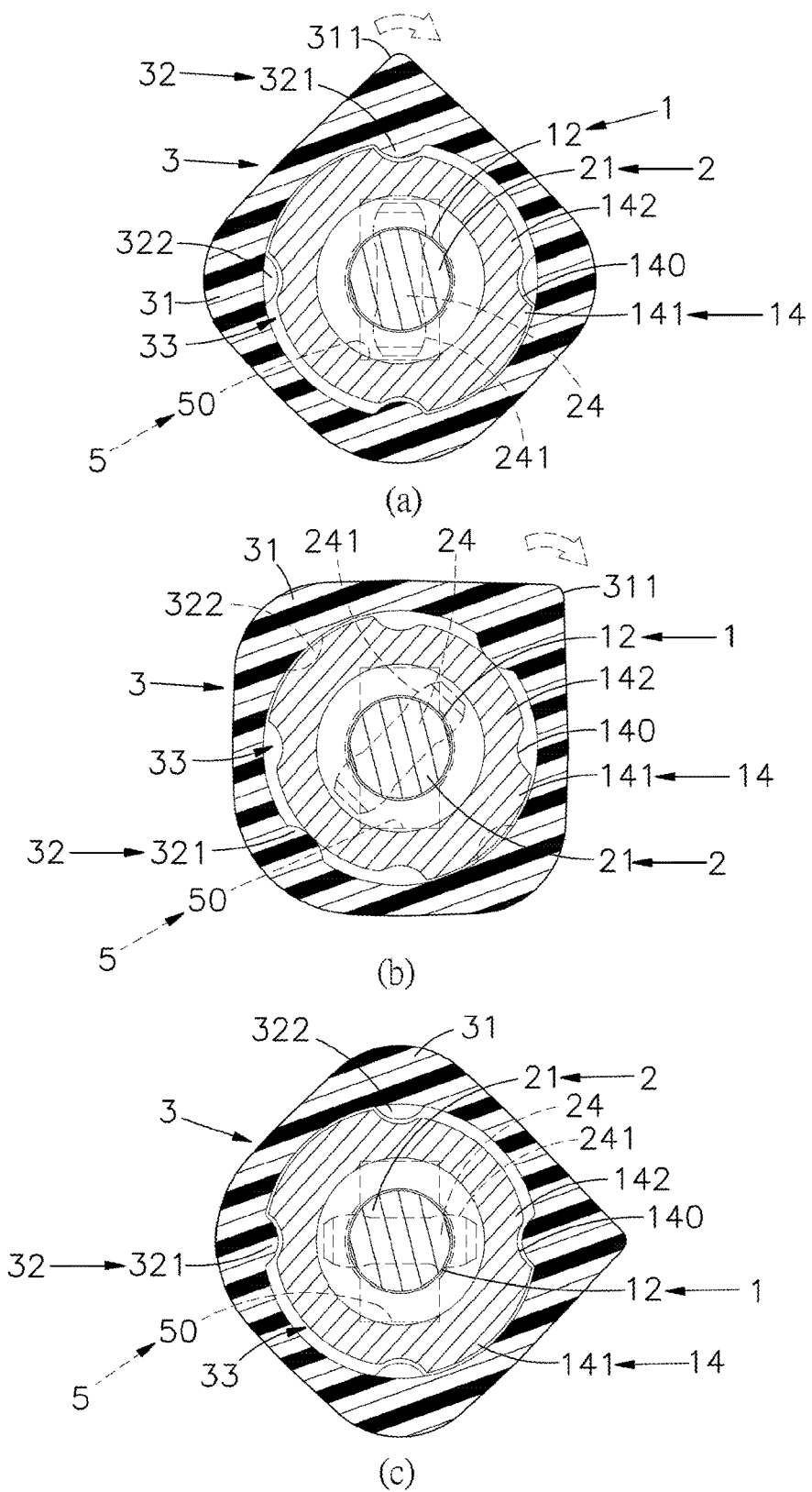
FIG. 6 is a top sectional view of rotation action of a drive cap of the fastening device of the present disclosure.

Please refer to FIGS. 1, 2 and 3, which respectively shows an elevational view and two exploded views from different directions, of the fastening device of the present disclosure. The fastening device includes a sleeve 1, a rotary knob device 2 and a drive cap 3.

The sleeve 1 is in a hollow shape and formed with a through-hole 10 inside, and the through-hole 10 defines a rotation space 11, which has a larger diameter, formed at a side thereof. An axle hole 12 having a reduced diameter is formed between the through-hole 10 and the rotation space 11. An abutting shoulder part 101 is formed in the through-hole 10 adjacent to the axle hole 12, and a stop surface 111 is formed inside the rotation space 11 adjacent to the axle hole 12. The sleeve 1 is formed with a fastening part 13 at a side thereof and corresponding in position to the rotation space 11, and a position-limiting ring 14 disposed at other side thereof opposite to the fastening part 13. The position-limiting ring 14 has an outer diameter larger than that of the fastening part 13. The position-limiting ring 14 includes at least two sets of fastening grooves 140 formed on a periphery thereof and opposite to each other, two first ring edges 141 separately formed between the any two adjacent fastening grooves 140, and two second ring edges 142 separately formed on the periphery and between the two first ring edges 141. The first ring edges 141 have an extended outer diameter, and the second ring edges 142 have a shrunk outer diameter.

The rotary knob device 2 includes a joint rod 211 disposed at a side of a rotary rod 21, and a rod head 22 linked with the other side of the joint rod 211 opposite to the rotary rod 21. An outer diameter of the rod head 22 is larger than that of the joint rod 211, and an outer diameter of the joint rod 211 is larger than that of the rotary rod 21. An elastic member 23 is mounted on the outside of the rotary rod 21 and abutted with a side of the rod head 22 by an end thereof. The rotary rod 21 includes a hole 210 formed on other side thereof remote from the rod head 22. The hole 210 laterally penetrates into the rotary rod 21. A rotation pin 24 is inserted through the hole 210, two ends of the rotation pin 24 exposed out of the hole 210 are processed, for example, by a hammering or forging manner, so that two protrusions 241 with larger outer diameter can be formed at two ends of the rotation pin 24 and separately exposed out of the hole 210, and the rotation pin 24 can be fixed in the hole 210 stably. The joint rod 211 is formed with two first plane sections 2111 on external side thereof, opposite to each other and corresponding in direction to the rotation pin 24 and the hole 210, and the rod head 22 is formed with two second plane sections 221 on an external side thereof, opposite to each other and corresponding in direction to the rotation pin 24 and the hole 210.

The drive cap 3 is in a hollow shape and defines an assembly space 30 which is formed with a fastening recess 301 on an inner side and having a larger diameter. A holding part 31 is formed on outer side of the fastening recess 301 in a rectangle shape and includes an indicative sharp corner 311. The drive cap 3 is formed with a sliding inner hole 32 adjacent to the fastening recess 301 and axially cut therethrough outwardly. At least two long protrusion rods 321 are formed on inside wall of the sliding inner hole 32 and opposing to each other, two short protrusion rods 322 are separately formed between the two adjacent long protrusion rods 321, and rotation sections 33 are formed between two long protrusion rods 321 and two short protrusion rods 322 adjacent to each other and near the fastening recess 301, so that the indicative sharp corner 311 of the holding part 31 can be aligned with one of the long protrusion rods 321 in the sliding inner hole 32.

In order to assemble aforementioned members, the rotary rod 21 of the rotary knob device 2 is movably inserted through the through-hole 10 and the axle hole 12 of the sleeve 1, the rotation pin 24 of the rotary rod 21 is abutted against the stop surface 111 in the rotation space 11, thereby preventing the rotary rod 21 from escaping out of the through-hole 10 and the axle hole 12 of the sleeve 1; the rotation pin 24 is longitudinally movable in the rotation space 11; the rod head 22 at the end of the rotary rod 21 is exposed out of the through-hole 10 of the sleeve 1, other end of the elastic member 23 which is mounted on the outside of the rotary rod 21 under the rod head 22 is abutted with the abutting shoulder part 101 in the through-hole 10; the rod head 22 is then mounted into the fastening recess 301 in the assembly space 30 of the drive cap 3, so that the position-limiting ring 14 of the sleeve 1 can be movably sleeved in the sliding inner hole 32 of the assembly space 30; the long protrusion rods 321 and short protrusion rods 322 on the inside wall of the sliding inner hole 32 are separately aligned and constrained with the position-limiting fastening grooves 140, so that the sleeve 1, the rotary knob device 2 and the drive cap 3 are assembled together to form the fastening device of the present disclosure.

The position-limiting ring 14 of the sleeve 1 is formed with at least two sets of position-limiting fastening grooves 140, the position-limiting rings 14 of each set are opposite to each other, and the position-limiting fastening grooves 140 are arranged on the periphery of the position-limiting ring 14 with equal angle of 90 degrees. As a result, two sets of the position-limiting fastening grooves 140 are staggered with each other in a cross arrangement on the periphery of the position-limiting ring 14, and the first ring edges 141 and the second ring edges 142 are formed on the outer periphery of the position-limiting ring 14. The first ring edges 141 are disposed opposite to each other, the second ring edges 142 are disposed opposite to each other, and the first ring edge 141 has a larger outer diameter, and the second ring edge 142 has a smaller outer diameter.

In the drive cap 3, the two long protrusion rods 321 and the two short protrusion rods 322 are separately formed on the inner wall of the sliding inner hole 32 and arranged with the same interval of 90 degrees, and the long protrusion rods 321 and the short protrusion rods 322 are separately staggered with each other, so that the a rotation section 33 with 180 degrees is formed near the fastening recess 301 between the two long protrusion rods 321, and also adjacent to ends of the two short protrusion rods 322. The position-limiting ring 14 of the sleeve 1 is covered by the rotation section 33 of the drive cap 3. While the drive cap 3 is driven, the two long protrusion rods 321 on the inside wall of the rotation section 33 is axially rotated between the two opposite second ring edges 142 along the periphery of the position-limiting ring 14 in clockwise or counter-clockwise direction; in this case, the two long protrusion rods 321 on the inside wall of the rotation section 33 are constrained by the two first ring edges 141, as a result, the drive cap 3 is constrained to rotatably reciprocate on the outside of the sleeve 1 in a range of about 90 degrees. Furthermore, it is easy to identify whether the drive cap 3 rotates the rotary knob device 2 to be in a locked state or an unlocked state, so that the operation of the fastening device is more time-saving and labor-saving.

Please refer to FIGS. 2, 4 through 7, which respectively show an exploded view of the fastening device of the present disclosure, a sectional side view of a preferred embodiment of the fastening device of the present disclosure, and a sectional side view of operation of the preferred embodiment, a top sectional view of rotation actions of the drive cap, and a sectional side view of rotation of the rotation pin. Through the fastening part 13 of the sleeve 1, the fastening device can be assembled in a fixing hole 40 of a predetermined first plate 4, and further combined with a predetermined second plate 5 under the predetermined first plate 4. The predetermined second plate 5 includes a through-hole 50 aligned with the fixing hole 40 of the predetermined first plate 4 and the sleeve 1. The through-hole 50 is in a long rectangular shape, so that the drive cap 3 above the sleeve 1 can be longitudinally pressed down to longitudinally move the rotary rod 21 of the rotary knob device 2 along the through-hole 10 and the axle hole 12 and, at the same time, the elastic member 23 mounted on the outside of the rotary rod 21 is compressed and the rotation pin 24 located at the end of the rotary rod 21 is moved out of the rotation space 11 of the sleeve 1, and the two short protrusion rods 322 on the inside wall of the sliding inner hole 32 of the drive cap 3 are moved downwardly to separate from the two position-limiting fastening grooves 140 of the position-limiting ring 14. As a result, the position-limiting ring 14 is moved to the rotation section 33 formed above the two short protrusion rods 322 and between the two long protrusion rods 321. Next, the two long protrusion rods 321 on the inside wall of the rotation section 33 of the drive cap 3 can be axially rotated along two outer edges of the second ring edges 142 of the position-limiting ring 14, so that the two long protrusion rods 321 of the drive cap 3 can be rotated and axially moved between the outer edges of the two second ring edges 142 in counter-clockwise or clockwise direction, for example, the two long protrusion rods 321 can be rotated by 90 degrees, as shown in parts (a) and (b) of FIG. 6. At the same time, the rotary rod 21 of the rotary knob device 2 and the rotation pin 24 both are axially rotated, and after being rotated, the rotation pin 24 are fastened with the rectangular hole of the predetermined second plate 5 in a perpendicularly-staggered way, as shown in part (c) of FIG. 6, so that the rotation pin 24 can be laterally fastened in the bottom of the through-hole 50. Therefore, the predetermined second plate 5 can be fastened under the bottom of the predetermined first plate 4, and they are locked and combined stably, and it is not easy to loosen or separate the combination of the predetermined second plate 5 and the predetermined first plate 4.

In order to separate the predetermined second plate 5 from the predetermined first plate 4, the drive cap 3 can be rotated in a direction opposite to the direction used in combination of the plates 4 and 5, by about 90 degrees, thereby rotating the rotary rod 21 and the rotation pin 24 of the rotary knob device 2. After the rotation pin 24 is rotated in the direction used in combination of the plates 4 and 5 and located in parallel with the rectangular-shaped through-hole 50 of the predetermined second plate 5, as shown in part (a) of FIG. 6, the two long protrusion rods 321 of the drive cap 3 are upwardly moved longitudinally along the two position-limiting fastening grooves 140 of the position-limiting ring 14 of the sleeve 1 under assistance of the elastic force of the elastic member 23, so that the rotation section 33 of the drive cap 3 is separated from the position-limiting ring 14, and the two long protrusion rods 321 and the short protrusion rods 322 are fastened in the position-limiting fastening grooves 140. The elastic member 23 also drives the rod head 22 of the rotary knob device 2 to upwardly move the rotary rod 21 along the through-hole 10 and the axle hole 12 longitudinally; as a result, the rotation pin 24 at the end of the rotary rod 21 enters the rotation space 11 of the sleeve 1 through the through-hole 50 of the predetermined second plate 5, and then abuts with the stop surface 111 on the inner side of the rotation space 11. Therefore, the predetermined second plate 5 is released from the locked and position-limiting state, and separated from the predetermined first plate 4 to be the unlocked state. Therefore, by rotating the drive cap 3 located above the sleeve 1 to drive the rotary knob device 2 to longitudinally move along the through-hole 10 and the axle hole 12 of the sleeve 1, the operation of combining the predetermined first plate 4 and the second plate 5 (that is, in the locked state) or separating the predetermined first plate 4 from the second plate 5 (that is, in the unlocked state) can be simpler, easier, time saving and labor-saving.

Figure 7:
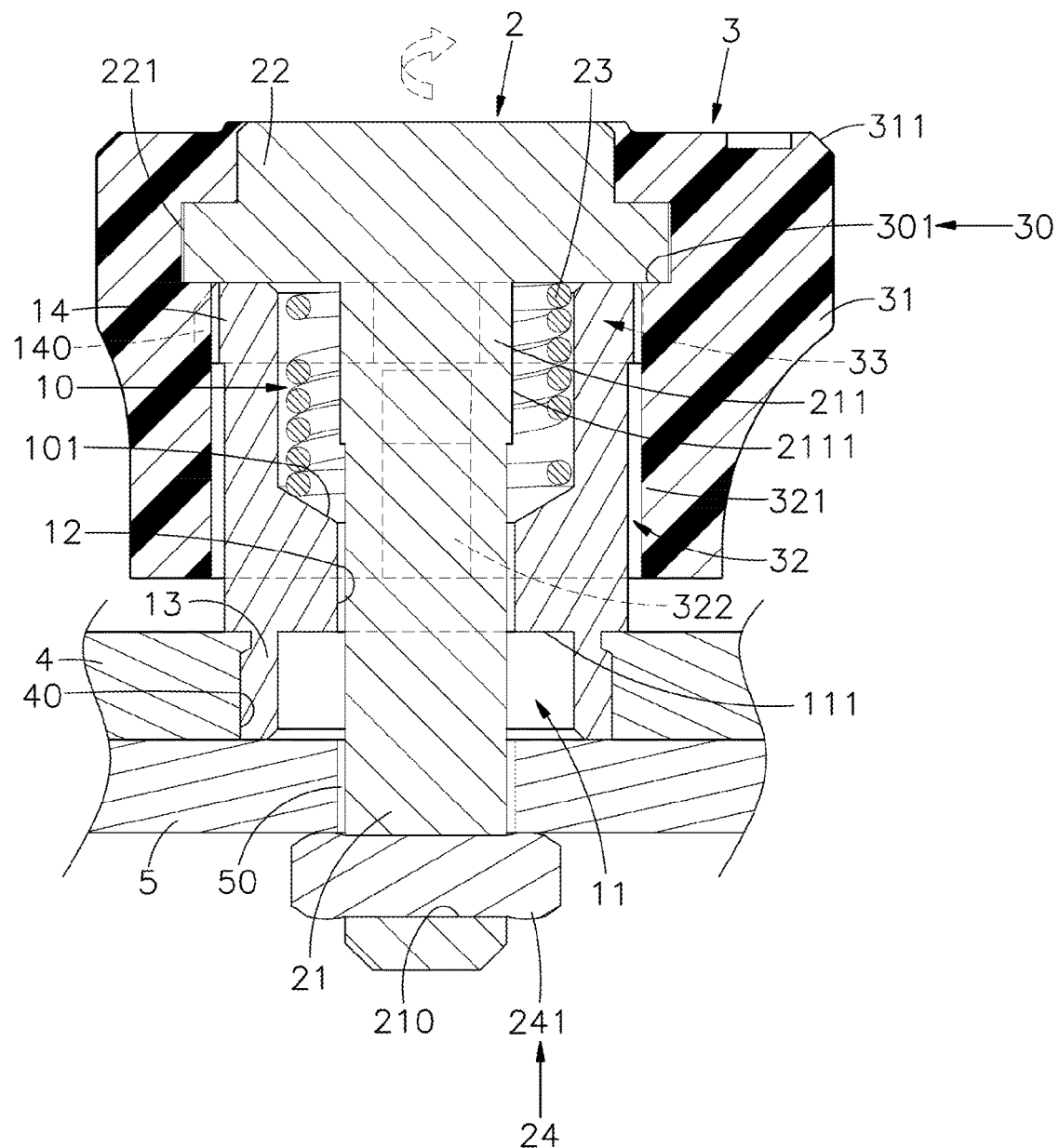
FIG. 7 is a sectional side view of rotation of a rotation pin of the fastening device of the present disclosure.
Figure 8:
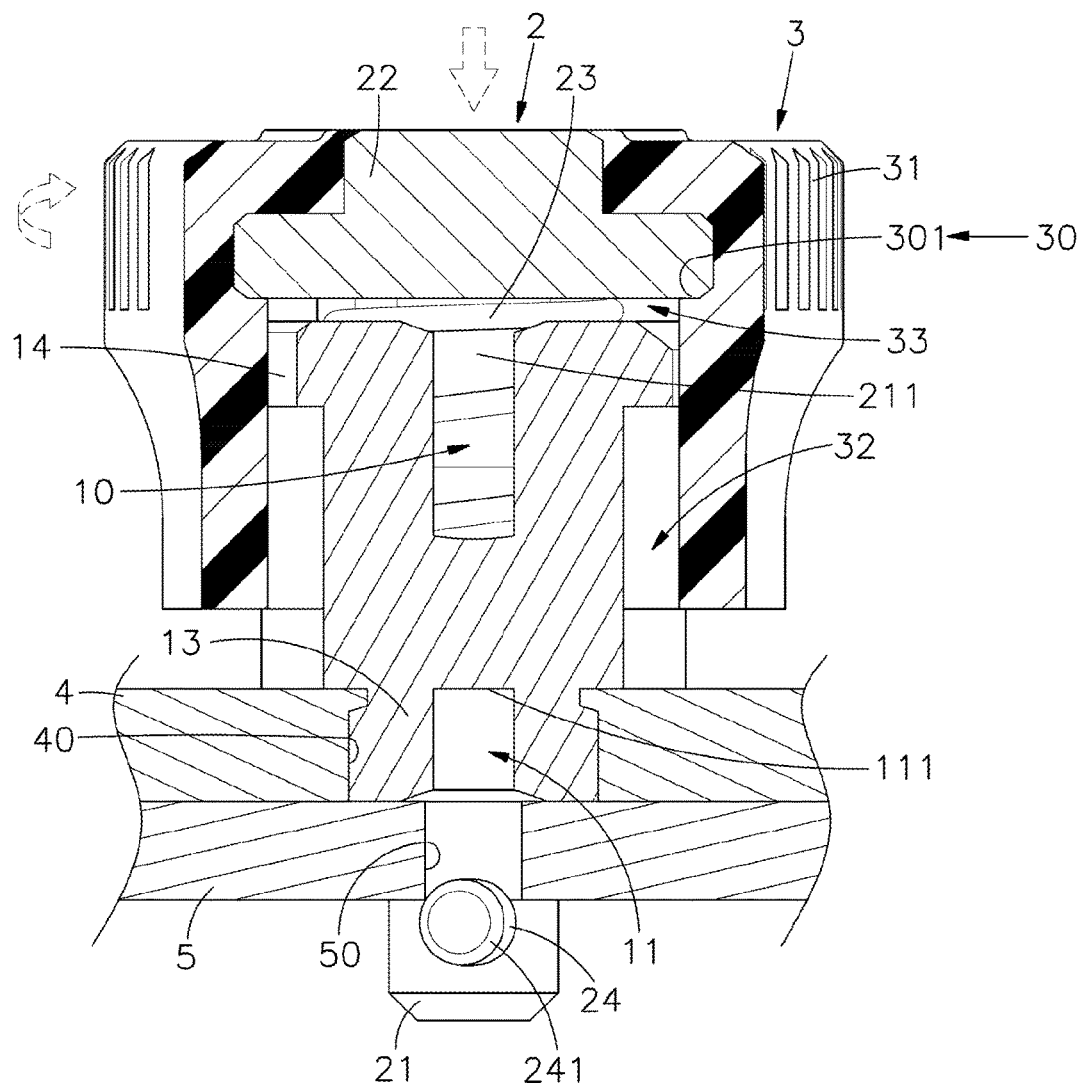
FIG. 8 is a sectional side view of movement of a rotation pin of other embodiment of the fastening device of the present disclosure.

Please refer to FIGS. 2, 3, 6 through 8, which respectively show two exploded views of the fastening device of the present disclosure viewed in different directions, a top sectional view of rotation actions of the drive cap, a sectional side view of rotation of the rotation pin, and a sectional side view of movement of a rotation pin of other embodiment. The drive cap 3 is located above the sleeve 1. While the drive cap 3 is pressed down along the sleeve 1 longitudinally and, meanwhile, the rotary rod 21 of the rotary knob device 2 is driven to move along the through-hole 10 and the axle hole 12 longitudinally, the elastic member 23 mounted on the outside of the rotary rod 21 is compressed, so that the rotation pin 24 at the end of the rotary rod 21 is moved out of the rotation space 11 of the sleeve 1, and the ring protrusions 241 having larger outer diameters and formed at two sides of the rotation pin 24 are abutted with the periphery of the through-hole 50 of the predetermined second plate 5, as shown in FIG. 8. The slide and longitudinal movement of the arc-shaped ring protrusion 241 along the periphery of the through-hole 50 can assist to downwardly and quickly move the rotation pin 24 along the periphery of the through-hole 50 in a longitudinal direction, thereby reducing the force required to press down the drive cap 3 and achieving effect of labor-saving in operation, Therefore, the user can operate the drive cap 3 to rotate the rotary rod 21 more smoothly subject to less resistance. After the rotation pin 24 passes the through-hole 50 quickly, the two short protrusion rods 322 on the inside wall of the sliding inner hole 32 of the drive cap 3 are moved downwardly to escape from the two position-limiting fastening grooves 140 of the position-limiting ring 14, so that the position-limiting ring 14 is moved to the rotation section 33 formed above the two short protrusion rods 322 and between the two long protrusion rods 321. Next, the two long protrusion rods 321 on the inside wall of the rotation section 33 of the drive cap 3 can be axially rotated along the outer edge of the two second ring edges 142 of the position-limiting ring 141, that is, the two long protrusion rods 321 of the drive cap 3 can be rotated and axially moved between the two second ring edges 142 in counter-clockwise (or clockwise) direction, for example, by about 90 degrees as shown in parts (a) and (b) of FIG. 6. At the same time, the rotary rod 21 and the rotation pin 24 of the rotary knob device 2 can be rotated axially, and after being rotated, the rotation pin 24 is fastened in the rectangular through-hole 50 of the predetermined second plate 5 in a perpendicularly-staggered way, as shown in part (c) of FIG. 6. As a result, the rotation pin 24 is laterally fastened at the bottom of the through-hole 50, as shown in FIG. 7, and the predetermined second plate 5 is fastened with the bottom of the predetermined first plate 4 in a locked, stably-combined, hard-to-loose state.

Figure 9:
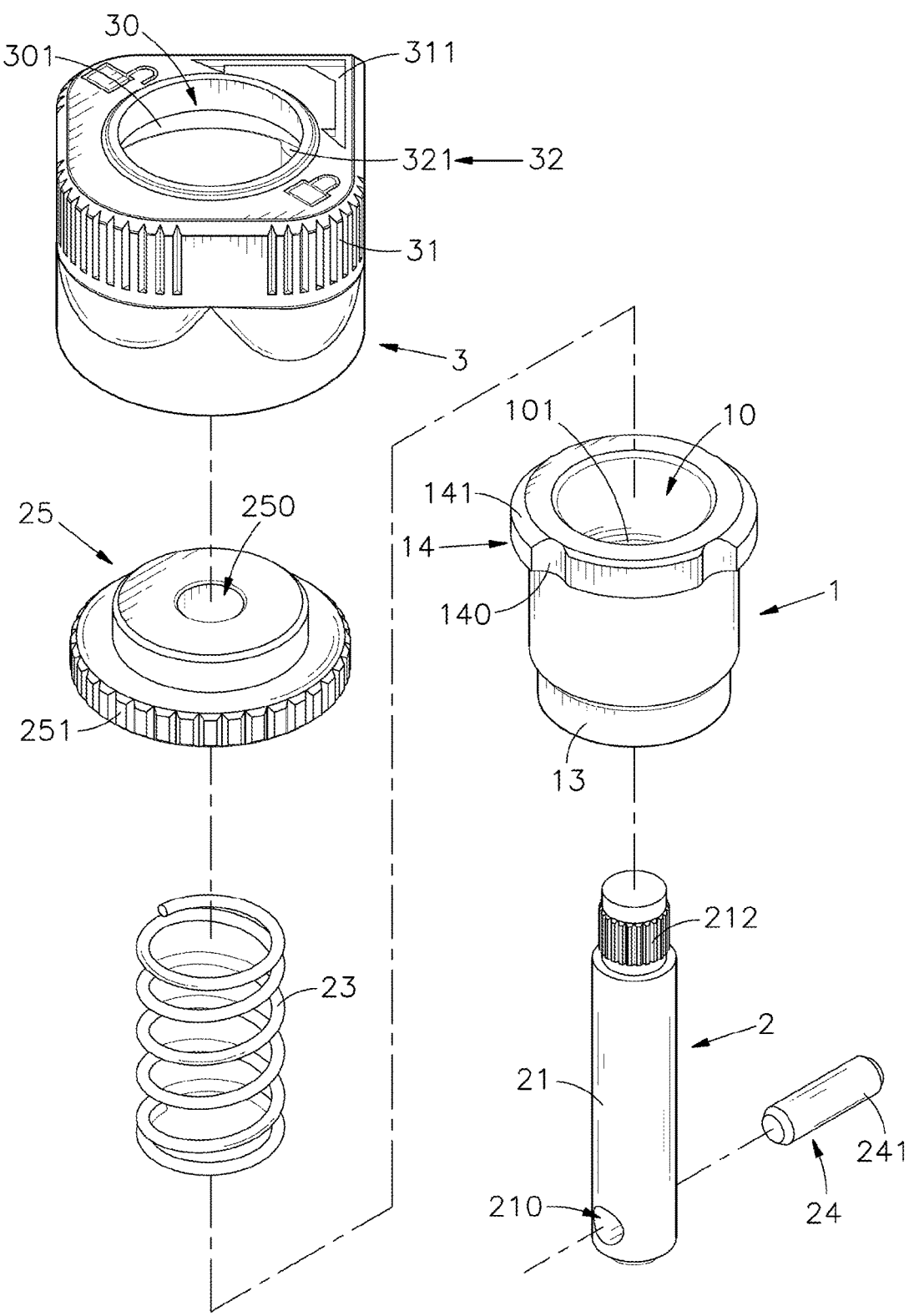
FIG. 9 is an exploded view of another embodiment of the fastening device of the present disclosure.
Figure 10:
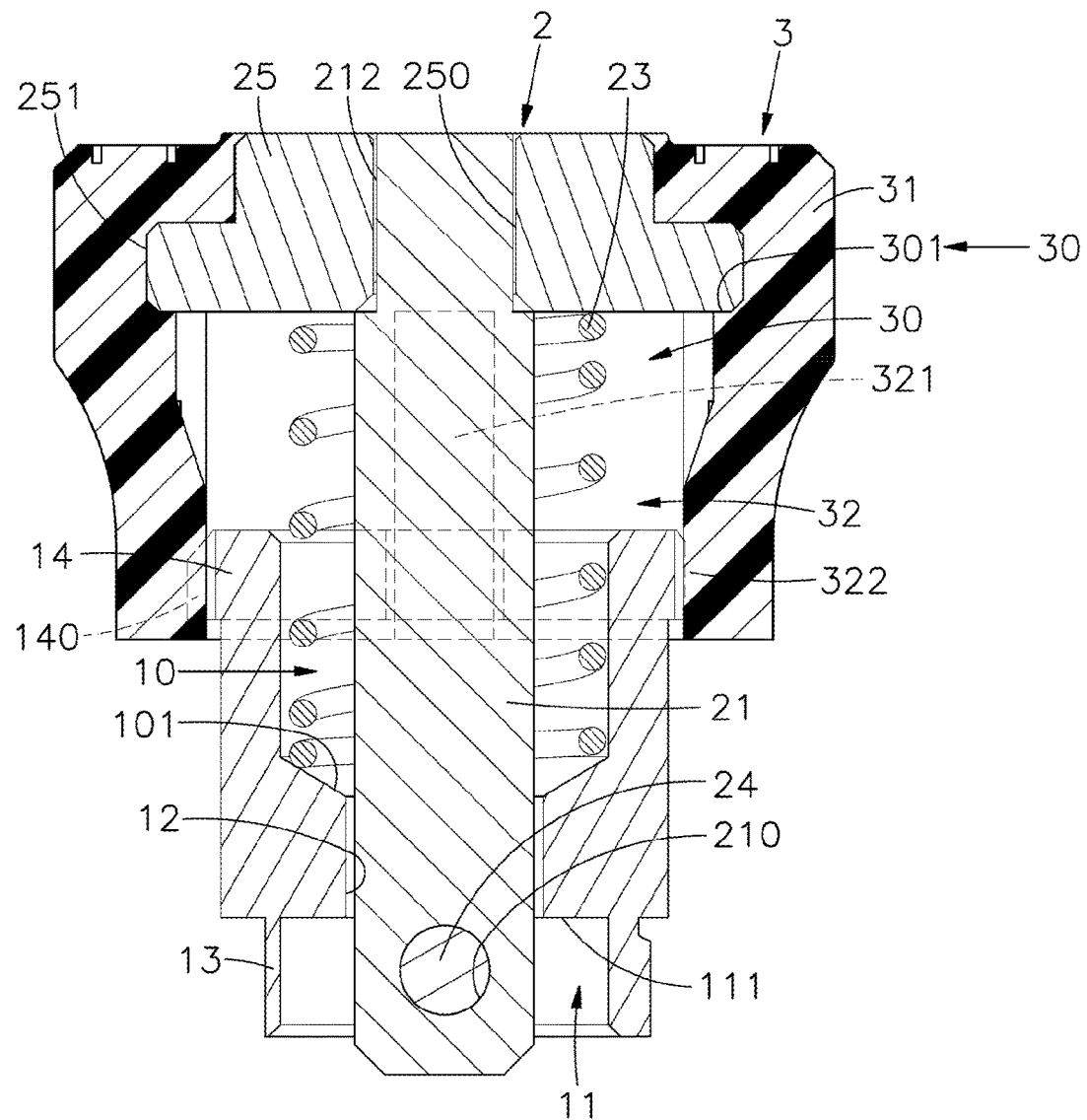
FIG. 10 is a sectional side view of another embodiment of the fastening device of the present disclosure.

Please refer to FIGS. 9 and 10, which respectively show an exploded view and a sectional side view of another embodiment of the present disclosure. The rotary knob device 2 of the fastening device of the present disclosure can include the rotary rod 21, the rotation pin 24 which is inserted through the hole 210 formed at the end of the rotary rod 21, and a combining rod 212 formed at other end of the rotary rod 21 and having a reduced diameter. The combining rod 212 can be used to assemble with a disk-shaped rod head 25, for example, the combining rod 212 can be fastened in a joint hole 250 of the disk-shaped rod head 25, and an annular engaging part 251 of the disk-shaped rod head 25 is fastened in a fastening recess 301 at a side of the assembly space 30 inside the drive cap 3, and the elastic member 23 is mounted on the outside of the rotary rod 21 which is fastened at the side of the disc-shaped rod head 25, and also movably inserted through the through-hole 10 and the axle hole 12 of the sleeve 1. The elastic member 23 includes an end abutted with a bottom surface of the annular engaging part 251 of the disc-shaped rod head 25, and other end abutted with the abutting shoulder part 101 of the through-hole 10 of the sleeve 1. The rotation pin 24 inserted through the end of the rotary rod 21 is located in the rotation space 11 of the sleeve 1. Therefore, the fastening device of another embodiment of the present disclosure is formed by assembly of the sleeve 1, the rotary rod 21 of the rotary knob device 2, the elastic member 23, the rotation pin 24, the disc-shaped rod head 25, and the drive cap 3.

It should be noted that the above-mentioned structure is a preferred embodiment of the present disclosure, and the present disclosure is not limited thereto. According to the fastening device of the present disclosure, the rotary rod 21 of the rotary knob device 2 is movably inserted through the through-hole 10 and the axle hole 12 inside the sleeve 1, the rotation pin 24 at the end of the rotary rod 21 is located in the rotation space 11 of the sleeve 1, the rod head 22 at other end of the rotary rod 21 is assembled with the drive sleeve 3, so that the rotary knob device 2 and the sleeve 1 are covered by the sliding inner hole 32 of the drive sleeve 3; the two long protrusion rods 321 and the two short protrusion rods 322 on the inside wall of the sliding inner hole 32 are separately aligned with and fastened in the position-limiting fastening grooves 140 of the position-limiting ring 14. The drive cap 3 can drive the rotary rod 21 of the rotary knob device 2 to longitudinally move along the through-hole 10 and the axle hole 12 of the sleeve 1, thereby achieving the purpose of simply operating the fastening device for locking or unlocking without using hand tools. Furthermore, the long protrusion rods 321 and the short protrusion rods 322 of the drive cap 3 are separately aligned with the position-limiting fastening grooves 140 of the position-limiting ring 14 of the sleeve 1, thereby providing the rotation-limiting effect for reciprocation in a range of about 180 degrees. As a result, it is easy to identify the locked or unlocked state of the drive cap 3. It should be noted that numerous modifications, variations and enhancements can be made thereto by those skilled in the art without departing from the spirit and scope of the invention set forth in the claims.

The present disclosure mainly directs to improve the fastening device in which the rotary knob device is movably inserted through the sleeve, the rotary rod at the end of the rotary knob device can be located in the rotation space of the sleeve, and the rod head at the other end of the rotary rod is assembled with the drive cap, so that the rotary knob device and the sleeve are covered in the sliding inner hole of the drive cap, and the two long protrusion rods and the two short protrusion rods on the inside wall of the sliding inner hole are separately aligned with and fastened in the position-limiting fastening grooves of the position-limiting ring of the sleeve. Therefore, the key points of the fastening device to be protected is that the fastening device can be operated without using hand tools, and is easy to operate for locking or unlocking and identify whether the drive cap drives the rotary knob device to rotate on the sleeve to be in the locked or unlocked state, so that the fastening device of the present disclosure has advantages of time-saving and labor-saving in operation.

The present disclosure disclosed herein has been described by means of specific embodiments. However, numerous modifications, variations and enhancements can be made thereto by those skilled in the art without departing from the spirit and scope of the invention set forth in the claims.

What is claimed is:

1. A fastening device comprising a sleeve, a rotary knob device and a drive cap, wherein:
    said sleeve is in a hollow shape and formed with a through-hole inside, and said through-hole defines a rotation space having a larger diameter at a side thereof, a fastening part is formed on an outer side thereof corresponding in position to said rotation space, and a position-limiting ring is formed on other side thereof opposite to said fastening part and has a larger diameter, and said position-limiting ring comprises at least two sets of position-limiting fastening grooves disposed on a periphery thereof and opposite to each other;
    wherein said rotary knob device is movably assembled in said through-hole of said sleeve and comprises a rotary rod movably inserted through said through-hole, and said rotary rod comprises a rotation pin formed at an end thereof and movably located in said rotation space of said through-hole, and a rod head disposed at other end thereof opposite to said rotation pin and exposed out of said sleeve, and an elastic member is mounted on the outside of said rotary rod under said rod head and abutted with an inner wall of said through-hole by other end thereof; and
    wherein said drive cap is assembled with said rotary knob device and comprises an assembly space inside for assembling with said rod head of said rotary knob device, and said rotary rod located at a side of said rod head is extended out of said drive cap along said assembly space, and said assembly space is formed with a sliding inner hole for covering said position-limiting ring of said sleeve, and said position-limiting ring is longitudinally movable in said sliding inner hole, and said sliding inner hole comprises two long protrusion rods formed on a sidewall thereof and opposite to each other, two short protrusion rods formed on the sidewall thereof and opposite to each other, each of said two short protrusion rods is disposed between said two long protrusion rods, and said two long protrusion rods and said two short protrusion rods are separately aligned with and fastened in said position-limiting fastening grooves formed on a periphery of said position-limiting ring of said sleeve.

2. The fastening device according to claim 1, wherein an axle hole is formed between said through-hole of said sleeve and said rotation space on a side of said sleeve, and said axle hole has reduced diameter and said rotary rod is inserted through said axle hole, and an abutting shoulder part is formed in said through-hole adjacent to said axle hole and configured to abut with an end of said elastic member.

3. The fastening device according to claim 1, wherein said at least two sets of the position-limiting fastening grooves are separately arranged with equal angles of 90 degrees on the periphery of said position-limiting ring, and two first ring edges having relatively larger outer diameters and second ring edges having relatively smaller outer diameters are separately formed on the periphery of said position-limiting ring and between said two adjacent position-limiting fastening grooves, and said drive cap comprises the said protrusion rods and two short protrusion rods formed on the inside wall of said sliding inner hole at a side of said assembly space and separately aligned with said position-limiting fastening grooves.

4. The fastening device according to claim 3, wherein said drive cap comprises two long protrusion rods opposite to each other and two short protrusion rods opposite to each other formed on the inside wall of said sliding inner hole at the side of said assembly space, said two long protrusion rods and said two short protrusion rods are arranged in equal angles of 90 degrees and staggered with each other, and rotation sections are separately formed adjacent to a fastening recess, between said two long protrusion rods and above said two short protrusion rods, and two second ring edges of said position-limiting ring at the side of a sleeve are axially-rotatably reciprocated in said rotation sections separately, and said two long protrusion rods of said drive cap are blocked by said two first ring edges.

5. The fastening device according to claim 1, wherein said rotary rod of said rotary knob device is formed with a hole laterally penetrating through said rotary rod, and said rotation pin is inserted through and positioned in said hole, and said rotation pin comprises ring protrusions disposed at two ends thereof and exposed out of said hole, said rotary rod comprises a joint rod formed at other side thereof remote from said rotation pin and having a larger outer diameter, and said rod head having an outer diameter larger than said joint rod is linked with other side of said joint rod, and each of said joint rod and said rod head comprises first plane sections and second plane sections in parallel to said rotation pin.

6. The fastening device according to claim 1, wherein said drive cap comprises a fastening recess formed on the inner side of said assembly space and configured to engage with said rod head of said rotary knob device, and a holding part in a rectangular shape and disposed on outer side thereof and corresponding in position to said fastening recess, and said holding part comprises an indicative sharp corner aligned with said long protrusion rod;

wherein said drive cap comprises said sliding inner hole inside and adjacent to said fastening recess, and said sliding inner hole is formed with said two long protrusion rods opposite to each other and extended from a lateral side of said fastening recess to external side of said sliding inner hole, and said two short protrusion rods opposite to each other, and each of said two short protrusion rods is disposed between said two long protrusion rods.

7. The fastening device according to claim 6, wherein said drive cap comprises said two long protrusion rods opposite to each other and said two short protrusion rod opposite to each other, and said two long protrusion rods and said two short protrusion rods are formed on an inside wall of said sliding inner hole at a side of said assembly space, arranged in equal angles of 90 degrees and staggered to each other, and rotation sections are separately formed adjacent to said fastening recess, between said two long protrusion rods and above said two short protrusion rods, and a position-limiting ring at the side of a sleeve are axially rotatable in rotation sections.

\* \* \* \* \*